United States Patent
Kim et al.

(10) Patent No.: US 8,792,415 B2
(45) Date of Patent: Jul. 29, 2014

(54) APPARATUS AND METHOD FOR SCHEDULING OF HIGH-SPEED PORTABLE INTERNET SYSTEM

(75) Inventors: Ju-Hee Kim, Daejeon (KR); Sook-Jin Lee, Daejeon (KR); Kyung-Soo Kim, Daejeon (KR)

(73) Assignees: Samsung Electronics Co., Ltd., Suwon-si (KR); Electronics and Telecommunications Research Institute, Daejeon (KR); KT Corporation, Seongnam (KR); SK Telecom Co., Ltd., Seoul (KR); KTFreetel Co., Ltd., Seoul (KR); Hanaro Telecom, Inc., Seoul (KR)

( * ) Notice: Subject to any disclaimer, the term of this patent is extended or adjusted under 35 U.S.C. 154(b) by 1774 days.

(21) Appl. No.: 11/993,936

(22) PCT Filed: Jun. 27, 2006

(86) PCT No.: PCT/KR2006/002481
§ 371 (c)(1),
(2), (4) Date: Dec. 26, 2007

(87) PCT Pub. No.: WO2007/001145
PCT Pub. Date: Jan. 4, 2007

(65) Prior Publication Data
US 2008/0186909 A1 Aug. 7, 2008

(30) Foreign Application Priority Data
Jun. 27, 2005 (KR) .................. 10-2005-0055653

(51) Int. Cl.
*H04W 4/00* (2009.01)
*H04J 3/22* (2006.01)
*H04B 7/212* (2006.01)
*H04L 12/403* (2006.01)
*H04L 12/28* (2006.01)
*H04W 28/14* (2009.01)
*H04W 72/12* (2009.01)
*H04W 28/06* (2009.01)

(52) U.S. Cl.
CPC ...... *H04W 72/1273* (2013.01); *H04W 72/1205* (2013.01); *H04W 28/065* (2013.01); *H04W 28/14* (2013.01)
USPC ........... 370/328; 370/468; 370/449; 370/443; 370/394

(58) Field of Classification Search
USPC ....................................... 370/328
See application file for complete search history.

(56) References Cited

U.S. PATENT DOCUMENTS 6,351,468 B1 * 2/2002 LaRowe et al. ............... 370/449
6,674,765 B1 * 1/2004 Chuah et al. .................. 370/458

(Continued)

FOREIGN PATENT DOCUMENTS

KR 1020030036980 A 5/2003
KR 1020030042846 A 6/2003

(Continued)

*Primary Examiner* — Noel Beharry
(74) *Attorney, Agent, or Firm* — Jefferson IP Law, LLP

(57) ABSTRACT

The present invention relates to a scheduling apparatus and a method thereof in an HPi system. A scheduling algorithm is applied appropriate to a characteristic of each multimedia service (e.g., real-time service, non real-time service, best-effort service, etc.) and a transmission order of the IP packets transmitted from a network is determined such that a transmit wait queue is generated. Radio resource allocation is performed in accordance with the order of the data items queued in the transmit wait queue, the size of transmittable data is determined such that a PDU is generated. In addition, frame data formed of bursts of PDUs is generated and transmitted to a physical layer. Therefore, a scheduling algorithm can be applied appropriate to characteristics of each multimedia service. In addition, packet scheduling is performed in two steps in order to schedule traffic corresponding to radio frames such that packets can be efficiently processed.

11 Claims, 9 Drawing Sheets

(56) References Cited

U.S. PATENT DOCUMENTS

| | | |
|---|---|---|
| 7,046,631 B1 * | 5/2006 | Giroux et al. ................ 370/234 |
| 2002/0075839 A1 * | 6/2002 | Dick et al. .................... 370/342 |
| 2003/0189943 A1 | 10/2003 | Gorti et al. |
| 2004/0258070 A1 | 12/2004 | Arima |
| 2005/0276266 A1 * | 12/2005 | Terry ............................ 370/394 |
| 2006/0153119 A1 * | 7/2006 | Ramanna et al. ............ 370/328 |

FOREIGN PATENT DOCUMENTS

| | | |
|---|---|---|
| KR | 1020040053859 A | 6/2004 |
| KR | 1020040076246 A | 8/2004 |
| KR | 1020050029112 A | 3/2005 |
| WO | WO 01/03400 A2 | 1/2001 |

* cited by examiner

APPARATUS AND METHOD FOR SCHEDULING OF HIGH-SPEED PORTABLE INTERNET SYSTEM

TECHNICAL FIELD

The present invention relates to a portable Internet system. More particularly, the present invention relates to a scheduling apparatus and a method thereof for performing efficient radio resource management while satisfying criteria of multimedia services in a portable Internet system.

BACKGROUND ART

An IEEE 802.16 wireless local area network (LAN) based high-speed portable Internet (HPi) is a 3.5 generation mobile communication system that provides image data and high-speed packet data transmission of various Internet protocol (IP) based wireless data services (e.g., streaming video, FTP, e-mail, chatting, etc.) available in a wired Internet using a wireless transmission technology that guarantees spectrum use efficiency in a frequency band of 2.3 GHz.

In general, a portable Internet system includes an access terminal (AT), an access point (AP) that supports a wireless access and a network connection of the AT, and a packet access router (PAR) performing mobility control and packet routing of each AT. The AP performs access control of the AT, packet matching between wired and wireless networks, wireless transmitting/receiving control, and radio resource management, and more particularly, it performs traffic processing and packet scheduling, wireless link control, radio resource management, and hybrid automatic repeat request (HARQ) control.

The portable Internet system transmits/receives data by frames to support high-speed packet data transmission in a wireless network, and employs orthogonal frequency division multiplexing (OFDM)/frequency division multiplexing access (FDMA)/time division duplex (TDD) wireless transmission algorithms. According to the OFDM/FDMA/TDD wireless transmission algorithms, data is transmitted and received on a subchannel formed of a subcarrier group and every frame transmits a MAP message at the beginning of each frame, and a data burst is transmitted subsequent to transmission of the MAP message. The MAP message contains frame configuration information.

Therefore, a scheduler allocates a subchannel for user data transmission of every frame, performs management scheduling, and composes a MAP message based on information on the scheduling. In general, system efficiency and transmission characteristics are greatly dependent on a scheduling algorithm employed by the AP, and implementation of the scheduling algorithm may vary according to the desired purpose.

The scheduling algorithm is implemented as a method for maximizing transmission efficiency of the system and guaranteeing fairness between terminals.

The maximization of transmission efficiency of the system is achieved by allocating a large amount of radio resource to a terminal having good channel quality. However, a terminal having bad channel quality cannot be provided with the radio resource even though the terminal has a large amount of data to transmit, and accordingly, the terminal may not be provided with the desired services.

A method for guaranteeing fairness between terminals is to allocate the radio resource evenly to every terminal without regard to channel quality. However, this method may reduce system efficiency because a great amount of radio resource may be allocated to the terminal having bad channel quality.

The portable Internet system provides various types of multimedia services such as a real-time service, a non real-time service, a best effort service, etc., but a conventional portable Internet system employs a scheduling algorithm appropriate for only a simple service rather than employing a scheduling algorithm that satisfies various conditions required for each service characteristic.

In addition, a minimum processing time should be guaranteed for scheduling of a conventional portable Internet system because the scheduling should be performed accurately corresponding to frame synchronization and a MAP message should be generated in advance while the scheduling is performed. Accordingly, a scheduling load may occur and affect the frame synchronization.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide scheduling having advantages of satisfying criteria of various types of multimedia services and performing efficient management of radio resources while preventing a load of the scheduling from influencing frame synchronization in a portable Internet system.

In addition, a packet scheduling process is divided into a time-insensitive first scheduling and a time-sensitive second scheduling, and a scheduling algorithm applied to the scheduling process is optimized for a characteristic of each multimedia service to achieve efficient packet scheduling.

Technical Solution

In one aspect of the present invention, a method for scheduling a packet transmitted to a user terminal from a base station in a portable Internet system is provided, the base station supporting a wireless access and a network connection of the user terminal, the method including: a) determining multimedia service types provided from the base station, selecting a given scheduling algorithm corresponding to the respective multimedia service types, applying the selected scheduling algorithm, determining a transmission order of packets transmitted through the network, and forming a transmit wait queue; and b) allocating radio resource to the packets queued in the transmit wait queue, determining the size of transmittable data, generating a protocol data unit (PDU) based on the size of the transmittable data, and generating frame data formed of a plurality of PDU bursts.

In another aspect of the present invention, a scheduling apparatus scheduling packets transmitted to a user terminal from a base station that supports wireless access and network connection of the user terminal in the portable Internet system is provided, the scheduling apparatus including a scheduler and a protocol data unit (PDU) generator generating a PDU according to generation information provided by the scheduler. The scheduler includes: a packet classifier analyzing a packet header transmitted from the network and classifying the packet; a storing unit storing the packet transmitted from the packet classifier; a first scheduling process module determining a packet transmission order per a multimedia service type, and forming a transmit wait queue; and a second scheduling process module allocating a radio resource for a packet queued in the transmit wait queue, selecting data to be transmitted at every frame, and generating the corresponding generation information.

BEST MODE

Figure 1:
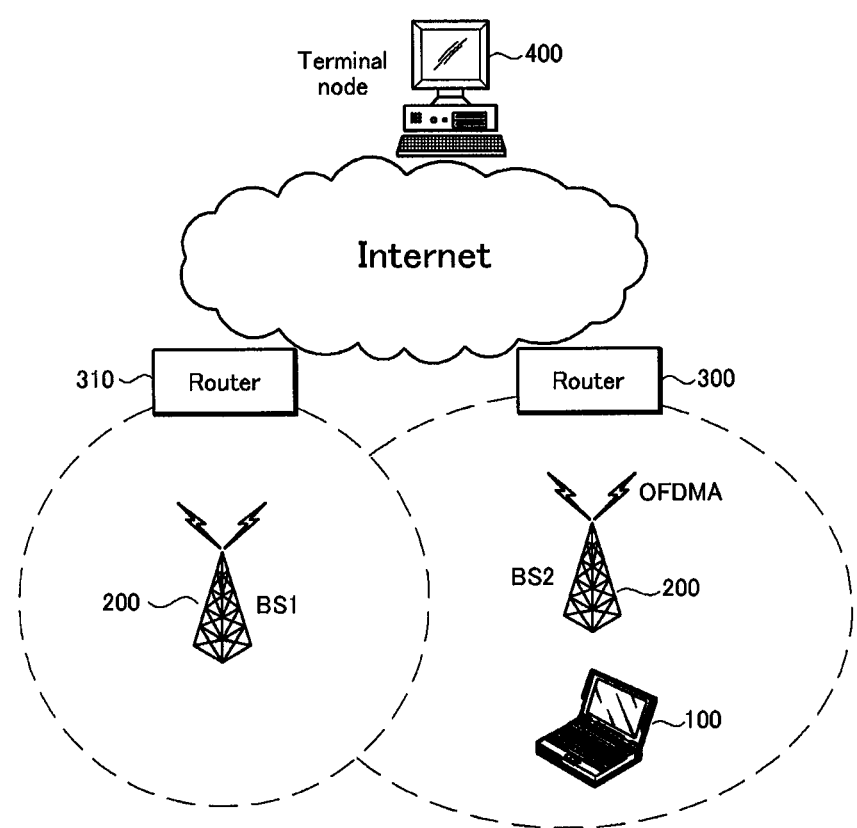
FIG. 1 is a schematic configuration diagram of a portable Internet system according to an exemplary embodiment of the present invention.

Exemplary embodiments of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a schematic configuration diagram of a portable Internet system according to an exemplary embodiment of the present invention.

The portable Internet system includes base stations 200, a mobile terminal 100 wirelessly communicating with the base stations 200, routers 300 and 310 connected to the mobile terminal 100 through a gateway, and an Internet. The mobile terminal 100 will be called a user terminal for better understanding and ease of description in the following exemplary embodiment of the present invention.

The portable Internet system supports mobility when the user terminal 100 of FIG. 1 moves from one cell served by the base station 200 to another cell served by the base station 200 to provide seamless data communication services. In addition, similar to mobile communication services, the portable Internet system supports a handover of the user terminal 100 and dynamically allocates an IP address corresponding to movement of the user terminal 100.

Herein, the user terminal 100 and the base stations 200 respectively communicate with each other using, though not specifically limited to, an orthogonal frequency division multiplexing access (OFDMA) scheme. The OFDMA scheme is a multiplexing method that combines a frequency division method using a plurality of orthogonal frequencies as a plurality of subcarriers and a time division method (TDM). The OFDMA scheme is resistant to multipath fading and is very suitable for high data rates.

The IEEE 802.16e employs an adaptive modulation and coding (AMC) scheme that adaptively selects modulation and a coding scheme according to request/acceptance between the user terminal 100 and the base stations 200.

Figure 2:
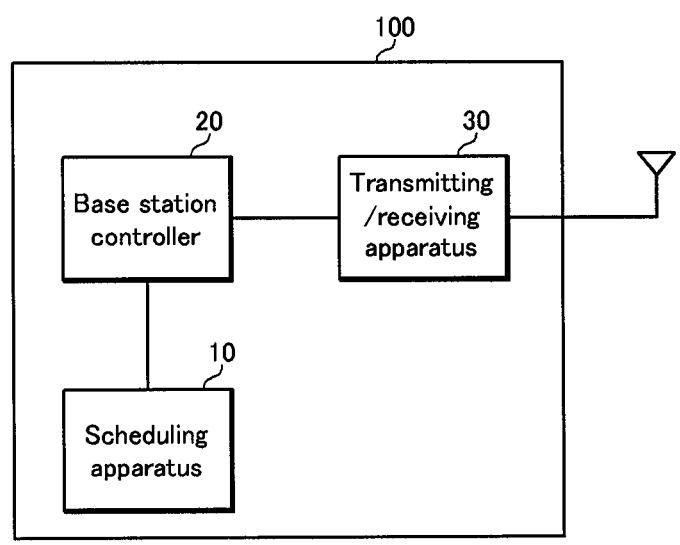
FIG. 2 is a configuration diagram of a base station according to an exemplary embodiment of the present invention.

FIG. 2 shows a base station with the above described structure of a portable Internet system.

As shown in FIG. 2, the base station 100 includes a scheduling apparatus 10, a base station controller 20, and a transmitting/receiving apparatus 30. The scheduling apparatus 10 processes traffic, schedules packets, controls a wireless link, manages radio resources, matches packets between wired and wireless networks, and controls hybrid automatic repeat requests (HARQ). The base station controller 20 processes control messages that control protocol operations so as to control the base station and user terminal, and the transmitting/receiving apparatus 30 performs data transmitting/receiving in the wireless network.

Figure 3:
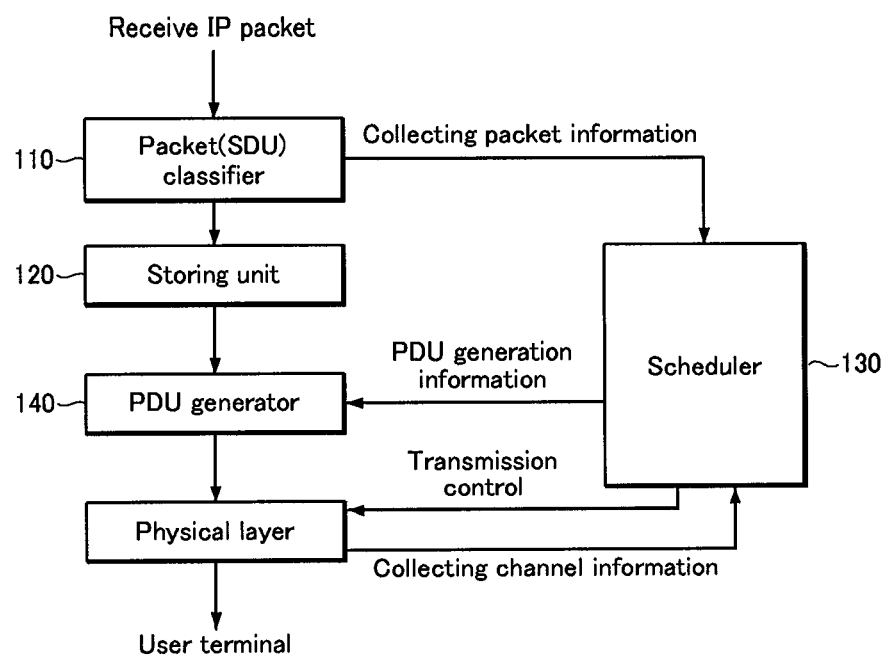
FIG. 3 is a detailed configuration diagram of the base station of FIG. 2.

FIG. 3 is a configuration diagram of a scheduler of the base station according to an exemplary embodiment of the present invention.

As shown in FIG. 3, the scheduling apparatus 10 includes a packet classifier 110, a storage unit 120, a scheduler 130, and a protocol data unit (PDU) generator 140.

The packet classifier 110 analyzes an IP packet header transmitted through a wired network, determines a user to be provided with the corresponding packet, a connection identifier (CID), and a packet arrival time, and generates IP packet information containing process priority of the corresponding packet. In addition, the packet classifier 110 determines a service type negotiated when a connection between the base station and the user terminal is established. The storage unit 120 stores IP packets transmitted from the packet classifier 110 before transmitting the IP packets through wireless network.

After receiving the IP packet information from the packet classifier 110 and channel quality information from a physical layer, the scheduler 130 performs scheduling based on the IP packet information and the channel quality information to select data to be transmitted by frames and data size and manage radio resources.

The PDU generator 140 receives PDU generation information containing data and a size of the data from the scheduler 130, and generates a PDU.

At this time, the scheduler 130 determines a packet transmission order by applying a scheduling algorithm appropriate for each multimedia service characteristic, creates a transmit wait queue, allocates a radio resource for the packets according to the order of items queued in the transmit wait queue, and determines the size of substantially transmittable data such that the scheduler 130 generates a burst containing MAC-PDUs.

Subsequently, the PDU generator 140 generates frame data formed of a plurality of bursts, and controls transmission of the frame data to the physical layer and the user terminal.

Figure 4:
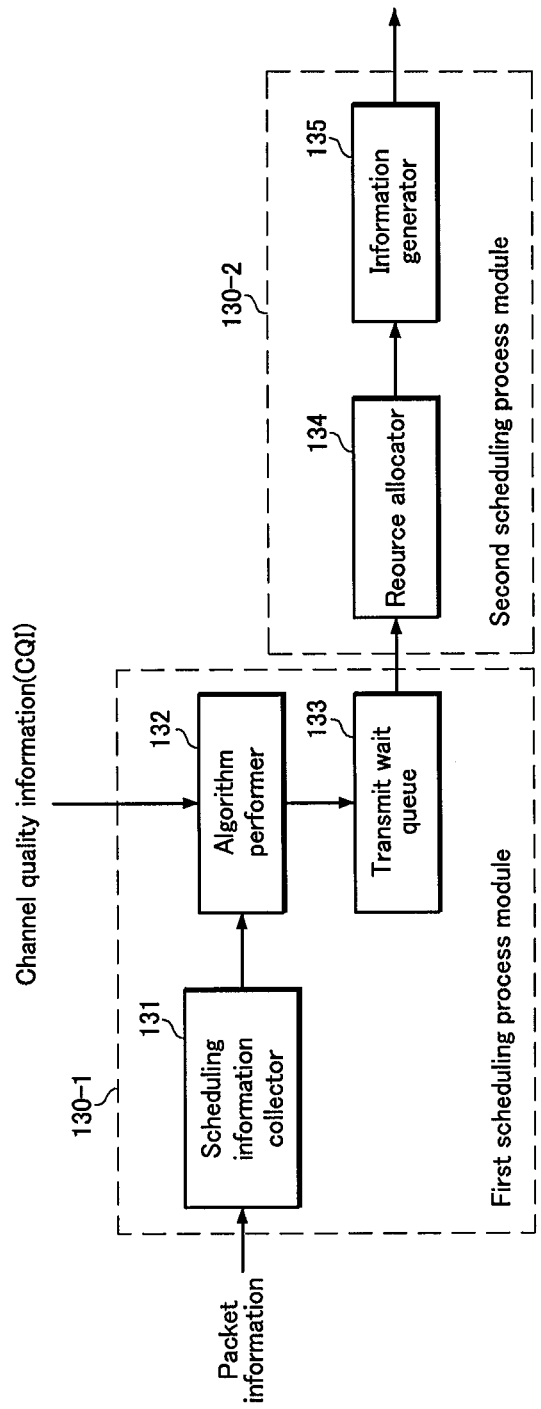
FIG. 4 is a detailed configuration diagram of a scheduler of FIG. 3.

FIG. 4 shows a structure of the scheduler 130 according to an exemplary embodiment of the present invention.

As shown in FIG. 4, the scheduler 130 includes a first scheduling process module 130-1 and a second scheduling process module 130-2.

The first scheduling process module 130-1 includes a scheduling information collector 131, an algorithm performer 132, and a wait queue generator 133. The scheduling information collector 131 collects scheduling information containing IP packet information and channel quality information on a received IP packet, the algorithm performer 132 performs a predetermined scheduling algorithm according to a service type of the packet and determines a packet transmission order for a service packet that is currently being served in accordance with the determination of the packet classifier 110 on the basis of the collected scheduling information, and the wait queue generator 133 generates a transmit wait queue based on the packets in the determined packet transmission order. The scheduling information collector 131 collects scheduling information at every packet arrival, and the algorithm performer 132 performs scheduling for a predetermined time on the basis of the collected information.

The second scheduling process module 130-2 includes a resource allocator 134 and an information generator 135. The resource allocator 134 allocates a wireless bandwidth to packets according to the order of data items queued in the transmit wait queue, and the information generator 135 determines the size of substantially transmittable data and generates PDU generation information according to a determination result. Subsequently, the PDU generator 140 generates a burst containing MAC-PDUs on the basis of the PDU generation information and generates frame data formed of a plurality of bursts. In addition, the PDU generator 140 transmits the frame data to the physical layer and to the user terminal.

Herein, the transmit wait queue is a data structure having several data items listed in a given order. Unlike in a stack, all insertions take place at one end and all deletions take place at the other end in the transmit wait queue. That is, the transmit wait queue is a first-in-first-out (FIFO) data structure and thus the first input data item is removed first and the last input data item is removed last. The transmit wait queue may be provided in a form of a connection list, and includes data items in a double linked list. Each data item respectively corresponds to a node of each list while pointing to another node, the node being a storing unit of data. Such a data item is a data structure that contains packet information on a service to be provided, the corresponding CID, channel quality, etc., and is processed in order when the scheduling is performed.

A scheduling method of a portable Internet system according to an exemplary embodiment of the present invention will now be described.

Figure 5:
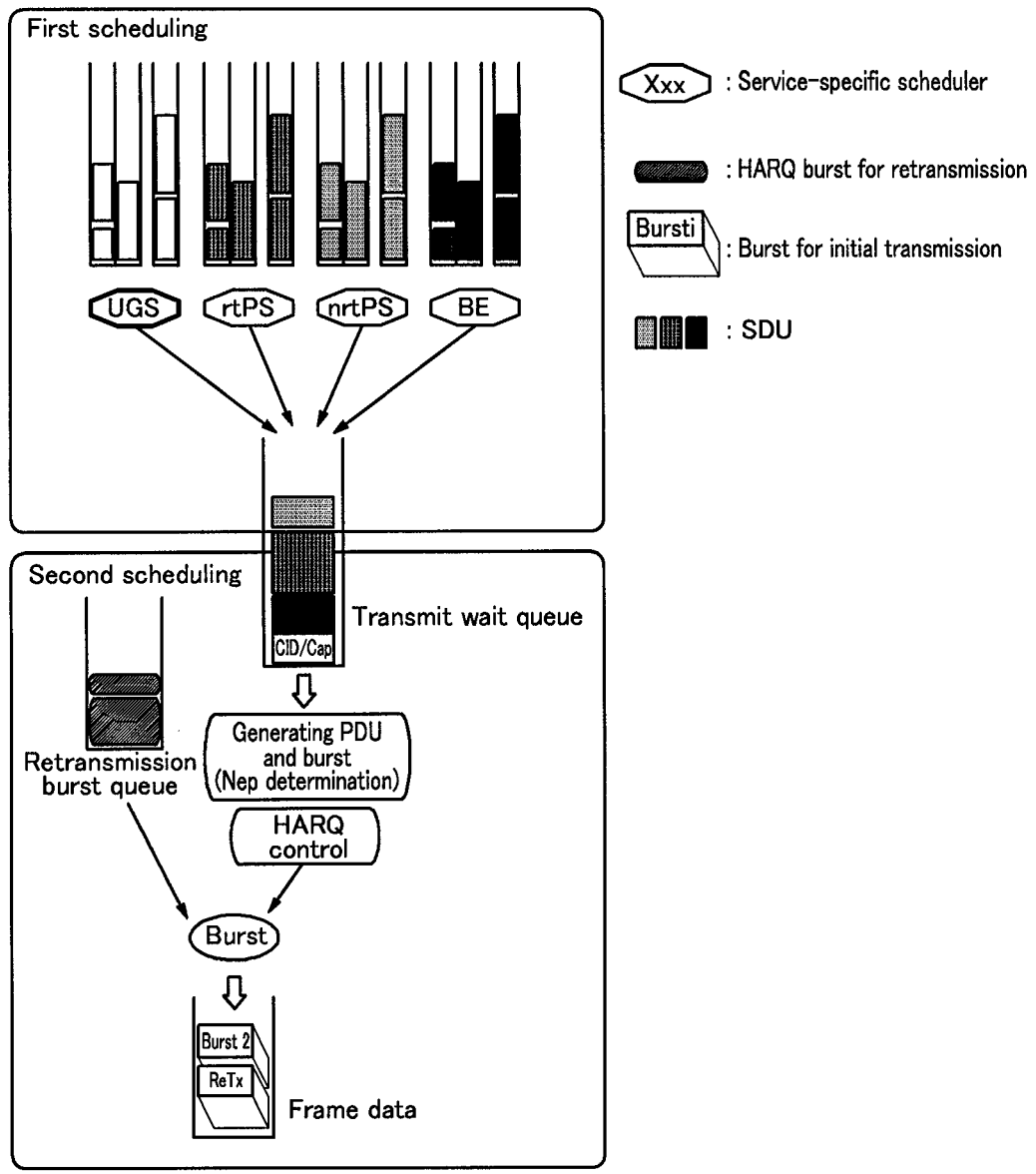
FIG. 5 is a schematic view of a scheduling method of a portable Internet system according to an exemplary embodiment of the present invention.

FIG. 5 is a schematic view of a scheduling algorithm of the portable Internet system according to the exemplary embodiment of the present invention.

As shown in FIG. 5, a transmit wait queue is formed after a packet transmission order is determined by applying scheduling algorithms respectively appropriate for characteristics of various multimedia services in a first scheduling. In addition, a burst of MAC-PDUs is generated by allocating a wireless bandwidth in accordance with the data item order queued in the transmit wait queue and determining the size of substantially transmittable data at every frame, and a plurality of bursts form a frame data in a second scheduling.

The base station transmits the frame data generated during the first and second scheduling to the physical layer, and controls transmission of the frame data to the user terminal.

A scheduling algorithm of the portable Internet system according to an exemplary embodiment of the present invention will now be described in more detail with reference to FIG. 6 to FIG. 9.

Figure 6:
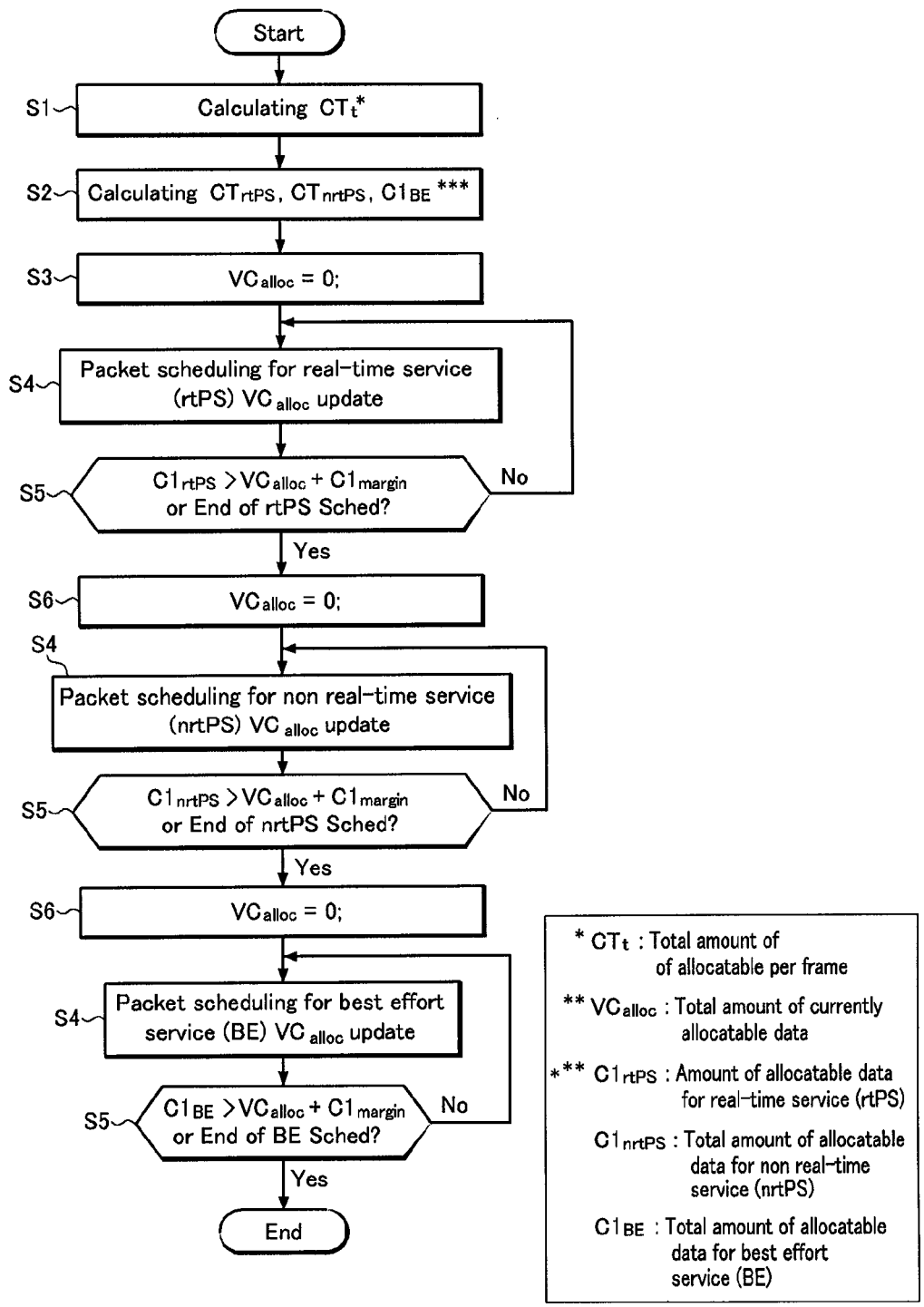
FIG. 6 is a flowchart showing detailed operation of a first scheduling of FIG. 5.
Figure 7:
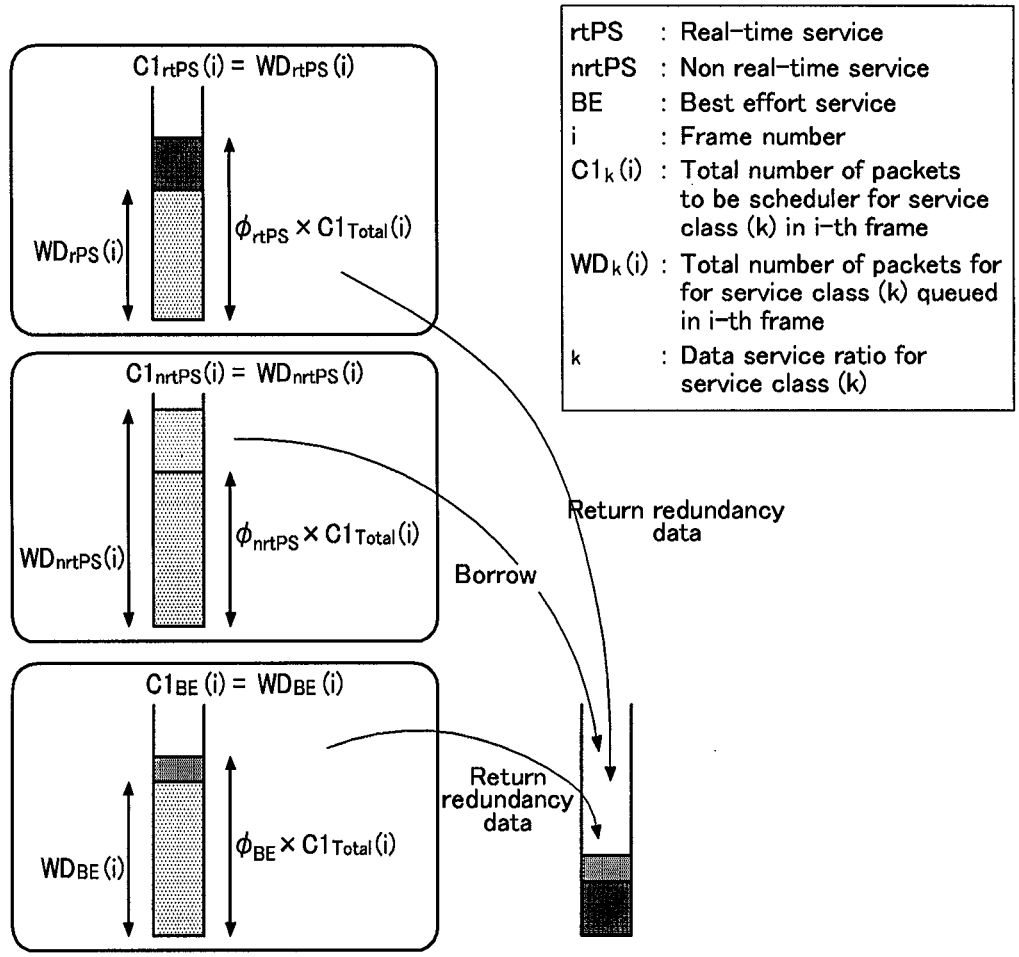
FIG. 7 shows a process of determining service-specific scheduling capacity in the first scheduling according to an exemplary embodiment of the present invention.
Figure 8:
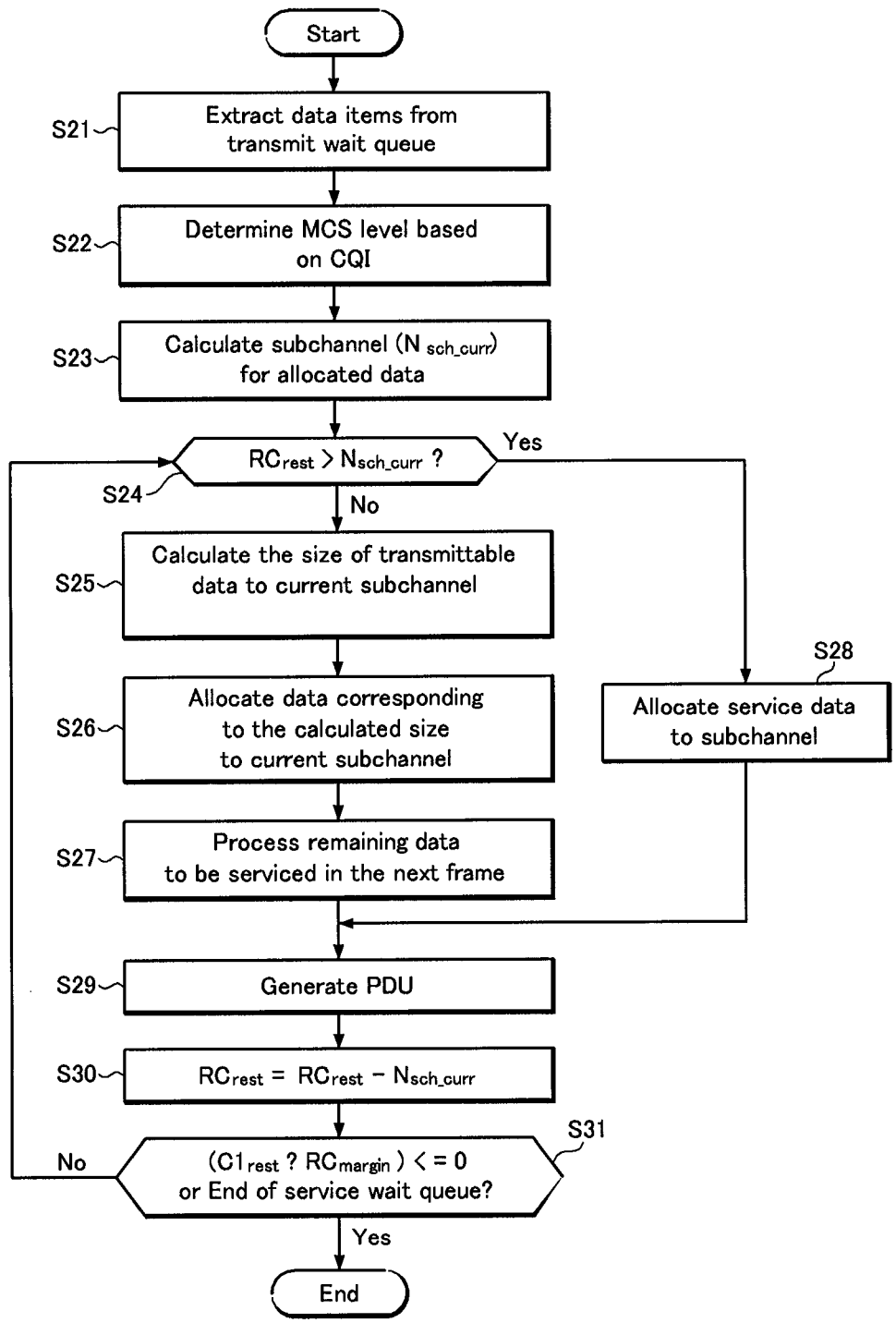
FIG. 8 is a flowchart showing a detailed operation in the second step of FIG. 5.
Figure 9:
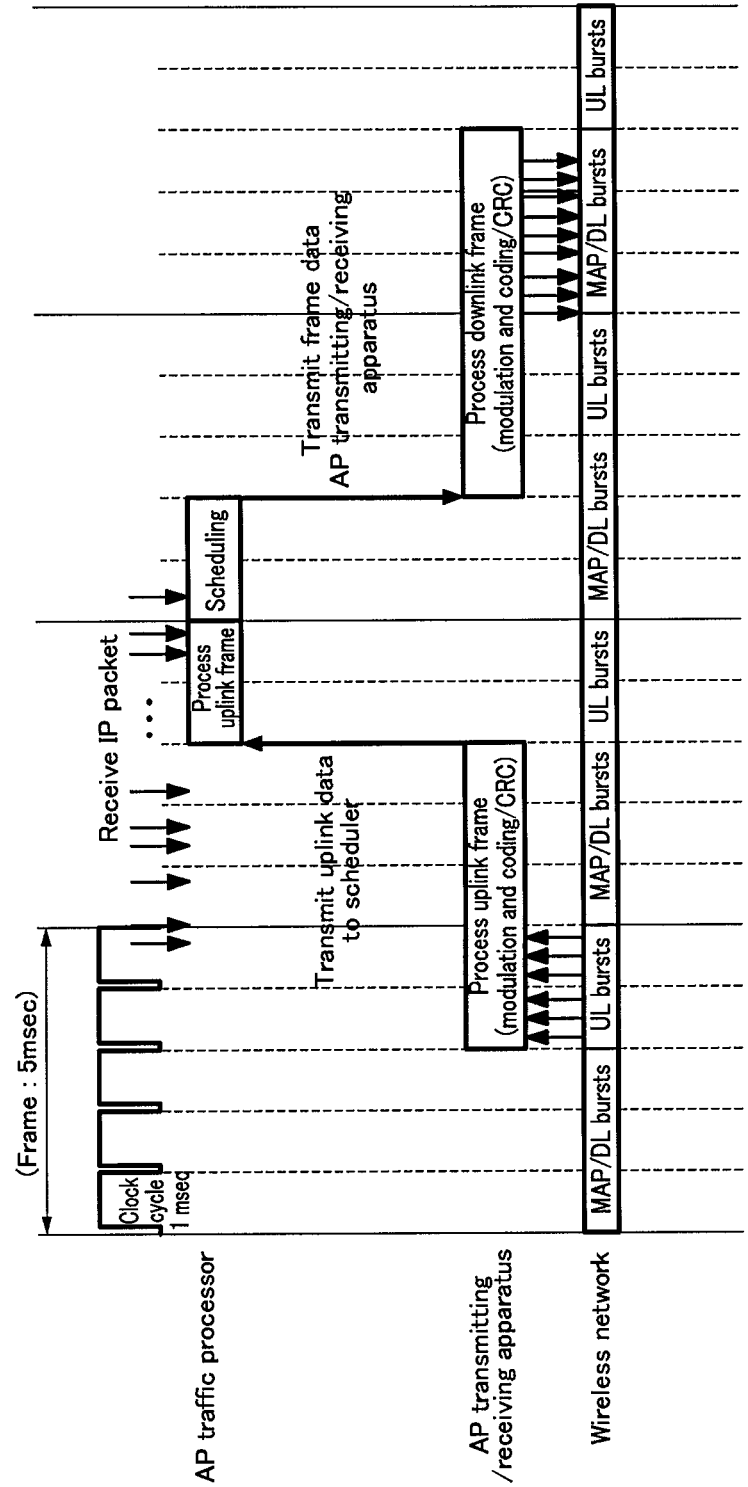
FIG. 9 is a frame-based operation timing diagram of a base station according to an exemplary embodiment of the present invention.

FIG. 6 is a detailed flowchart of an operation of the first scheduling of FIG. 5, and FIG. 7 shows a process of determining service-specific scheduling capacity in the first scheduling. FIG. 8 is a detailed flowchart of an operation of the second scheduling of FIG. 5. In addition, FIG. 9 is a frame-based operation timing diagram of the base station according to an exemplary embodiment of the present invention.

As shown in FIG. 6 and FIG. 7, a total amount of data $C1_{i,k}$ that can be selected for the respective service types is calculated in the first scheduling. In more detail, a total amount of preservice data $PreC1_{i,k}$ is calculated by dividing a total amount of data $CT_j$ that can be processed in the first scheduling according to a service-specific data service rate $\Phi_k$, the total amount of data $CT_j$ representing a total amount of data allocatable to the respective frames.

In addition, as shown in Equation 1, the total amount of preservice data $PreC1_{i,k}$ and a total amount of queued service packets $WD_{i,k}$ are compared and the smaller one is determined to be a total amount of data $C1_{i,k}$ for the corresponding service during the first scheduling. In addition, when the total amount of preservice data $PreC1_{i,k}$ is greater than the determined total amount of data $C1_{i,k}$, a difference between $PreC1_{i,k}$ and $C1_{i,k}$ is reserved as a redundancy capacity and stored in a redundancy data pool $EC_i$.

On the other hand, when the total amount of the preservice data $PreC1_{i,k}$ is less than the total amount of queued service packets $WD_{i,k}$, the corresponding frame may borrow redundancy capacity from the redundancy data pool $EC_i$. At this time, priority of use of the redundancy capacity is determined in accordance with importance of a service type. For example, among multimedia services, a real-time service has the highest priority of using the redundancy capacity. As shown in FIG. 6, a total capacity $C1_{i,k}$: $C1_{rtps}$, $C1_{nrtps}$, $C1_{BE}$ of data for each service is determined in a manner like the above steps S1 through S3. In FIG. 6, $VC_{alloc}$ is a parameter representing data capacity allocated to a current service and $VC_{alloc}=0$ represents that $VC_{alloc}$ is initialized to zero. In addition, $VC_{alloc}$ may be increased to the determined total capacity $C1_{i,k}$. Such a total capacity determined for each service may be determined by a task (not shown) controlling a call and is not restrictive.

$$C1_{i,k} = \min(preC1_{i,k}, WD_{i,k}) + a, \text{ for any } k, \qquad \text{[Equation 1]}$$

where
i: frame number
k: service class
$PreC1_{i,k} = C1_{i,total} \times \phi_k$
$WD_{i,k}$: a total capacity of data traffic currently stored in a buffer $$a_i = \begin{cases} 0, & \text{if } WD_{i,k} \leq PreC1_{i,k} \\ EC_i, & \text{else} \end{cases}$$

When a total capacity $C1_{i,k}$ for each service is determined in such a way, the algorithm performer 132 of the scheduler 130 selects a number of packets that correspond to the total capacity $C1_{i,k}$ according to a scheduling algorithm set appropriate to each service in order of importance of service (that is, in order of real-time service, non real-time service, and best effort service), and stores information of the selected packets in the transmit wait queue generated by the transmit wait queue generator 133 steps S4 through S11.

The transmit wait queue is formed of linked lists storing items that contain packet information, connection identification, and importance of the corresponding service. The transmit wait queue will be referred to when the PDU generator 140 generates a MAC-PDU for wireless network transmission in a second scheduling. In addition, to avoid duplication of a substantial data packet stored in the storage unit 120, the transmit wait queue may store information on an address of the substantial data.

The scheduling algorithms used for the respective services preferably guarantee quality of service (QoS) and take account of user radio channel quality. For example, a first scheduling algorithm is applied to a real-time service for shortening delay time, a second scheduling algorithm is applied to a non real-time service for guaranteeing a minimum transmission speed, and a third scheduling algorithm is applied to a best effort service for guaranteeing fairness or system efficiency in accordance with a desired performance standard. In the scheduling apparatus according to the present invention, each service is provided with a scheduling algorithm optimized for characteristics of the service, and the algorithm performer 132 performs the scheduling algorithms optimized for the respective services.

According to a specific scheduling algorithm in the first scheduling, an IP packet is transmitted from a network, a packet determination process is performed by the packet classifier 110, scheduling information is collected, and importance of the corresponding service is calculated in order to save scheduling time. That is, when a connection between the base station and the user terminal is established, a service to be offered is determined and a packet of the service is transmitted. Subsequently, the packet classifier 110 determines a type of the service and generates IP packet information by performing the packet determination process to determine a packet-specific user, a CID, and priority of the corresponding service. Subsequently, the scheduler 130 collects scheduling information that contains IP packet information and channel quality information upon arrival of the corresponding packet, and calculates importance of the corresponding service.

For example, when a first-come-first-service (FCFS) scheduling algorithm is applied, the scheduler 130 receives a packet, determines the corresponding CID, and stores the packet information in a service waiting list in the FCFS scheduler, While the first scheduling is performed in such a way, searching and prioritizing storage units 120 of every user may be skipped thereby saving scheduling time.

A second scheduling is performed after the first scheduling is finished.

With reference to FIG. 8, in the second scheduling, the resource allocator 134 of the scheduler 130 extracts items from a head of the transmit wait queue, which has been updated in accordance with a result of the first scheduling, and determines a modulation and coding scheme level. An adaptive modulation and coding (AMC) scheme is employed to guarantee radio transmission, and accordingly, user channel quality should be taken into account when determining an appropriate MCS level. Hence, the MCS level is set from a MAC table (CQI threshold-MCS level) on the basis of channel quality indicators (CQI) received from the user terminal at every frame, the MAC table corresponding to a cell setting parameter. Herein, obtaining channel quality information form the user terminal is well known to those skilled in the art, and accordingly, a further description will not be provided.

The MCS table contains minimum entry channel information and the corresponding mandatory exit channel information for each MSC level. Thus when a value of CQI of each user is received, the value of CQI is set to be within threshold values of minimum entry threshold channel quality and mandatory exit threshold channel quality, in steps S21 and S22.

When a MCS level of each user is determined, the resource allocator 134 calculates the number of subchannels $N_{sch\_curr}$ for data transmission as shown in Equation 2 in step S23.

$$\text{The number of subchannels} = \frac{\text{size of allocated data}}{(MOD \times CR) \times 6}, \quad [\text{Equation 2}]$$

where MOD: modulation factor (QPAK: 2, 16QAM: 6)
CR: coding rate

Herein, MOD and CR are AMC information determined in accordance with radio channel quality.

When the number of calculated subchannels $N_{sch\_curr}$ is greater than the number of remaining subchannels $RC_{rest}$, the information generator 135 of the scheduler 130 calculates the size of service data transmittable to a currently available subchannel. In addition, data corresponding to the calculated size is allocated to the currently available subchannel, and other data is allocated to the next frame through steps S24 to S27. However, when the calculated number of subchannels $N_{sch\_curr}$ is less than the remaining number of subchannels $RC_{rest}$ of a current frame, all data to be served service is allocated to the currently available subchannel in step S28.

The information generator 135 of the scheduler 130 provides PDU generation information to the PDU generator 140 for generation of a MAC-PDU for radio transmission of allocated data in step S29. Subsequently, the PDU generator 140 generates a PDU on the basis of the PDU generation information containing data and the size of the data transmitted from the scheduler 130, and particularly, generates a MAC-PDU burst and transmits frame data formed of a plurality of bursts to the physical layer.

The scheduler 130 iteratively performs the above process until no subchannel remains in a current frame through steps S30 and S31. In addition, when packets queued in the transmit wait queue are not transmitted in a current frame, a limit of the total amount of packets waiting for each service is controlled in accordance with the total amount of packets queued in the transmit wait queue.

When the HARQ is applied to the portable Internet system according to an exemplary embodiment of the present invention, a MCS level of a burst waiting for retransmission due to a transmission failure is set and a radio resource is allocated before searching the transmit wait queue. In this instance, a total amount of data, failed in transmission in the current frame due to a bad channel condition or other reasons and thus waiting for retransmission, is set to be processed in the first scheduling by the scheduler 130. That is, an amount of data transmittable per one frame in the first scheduling may be obtained by subtracting an amount of remaining data from the total amount of transmittable data $CT_i$.

According to the above described exemplary embodiment of the present invention, the first scheduling is not sensitive to frame synchronization and accordingly, the first scheduling may be performed during a spare time while the base station traffic processor is being operated.

In more detail, for conventional uplink/downlink traffic transmitting/receiving, a scheduler of a portable Internet with a physical layer frame structure having 5 msec frame duration, for example, is expected to process an uplink bandwidth request from a previous frame, perform downlink scheduling, and generate frame data and frame information before frame transmission of a physical layer. Accordingly, the scheduler is scheduling time-sensitive.

However, since the first scheduling only determines service priority of each packet according to the exemplary embodiment of the present invention, it is not necessary to transmit every packet during the current frame and remaining packets can be transmitted during the next frame according to the service priority. Therefore, performance of the first scheduling may not need to correspond to frame synchronization, and the first scheduling may be performed at some other time than the time set for the first scheduling.

Referring to FIG. 9, the scheduling should be performed during the first 2 msec of frame duration for MAP transmission. However, the scheduling includes radio resource allocation and MAP generation according to the exemplary embodiment of the present invention, and accordingly, it is not necessary to perform the first scheduling during the first 2 msec. Therefore, the first scheduling is not necessarily performed within 2 msec. Thus, the first scheduling may be performed when the base station processes traffic because the first scheduling is not sensitive to the frame synchronization, thereby reducing a load due to scheduling.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

As described, a scheduling algorithm may be appropriately applied to particular service characteristics of each multimedia in the portable Internet system according to the exemplary embodiment of the present invention. In addition, a packet scheduling process may be divided into a time-insensitive first scheduling and a time-sensitive second scheduling in order to schedule traffic corresponding to radio frames such that the packets can be efficiently processed. Particularly, the first scheduling is not sensitive to the frame synchronization and thus the first scheduling may be performed during a spare time while the base station traffic processor is being driven. Therefore, a load due to the scheduling may be reduced.

In addition, a system operator may control a limit to services for each type of traffic and perform HARQ control with ease.

The invention claimed is:

1. A method for scheduling a packet transmitted to a user terminal from a base station, the base station supporting a wireless access and a network connection of the user terminal, the method comprising:
   a) determining multimedia service types provided by the base station, selecting a given scheduling algorithm corresponding to the respective multimedia service types based on quality of service for the respective multimedia service types, determining a transmission order of packets by applying the selected scheduling algorithm to the packets received through the network, forming a transmit wait queue, determining an amount of data allocation for each service available in a current frame in consideration of data service rates for the respective multimedia service types and a total number of packets queued for each service and selecting packets corresponding to the determined amount of data allocation for each service according to a scheduling algorithm applied for each service and storing packet information in the transmit wait queue; and
   b) allocating radio resources to the packets queued in the transmit wait queue, determining the size of transmittable data, generating a protocol data unit (PDU) based on the size of the transmittable data, and generating frame data formed of a plurality of PDU bursts,
   wherein the multimedia service types include a real-time service, a non-real-time service and a best-effort service.

2. The method of claim 1, wherein a) further comprises:
   before applying the scheduling algorithm, receiving a packet from the network, generating Internet protocol (IP) packet information by performing packet determination for determining the corresponding user, a connection identifier, and priority, collecting scheduling information containing the IP packet information and channel quality information transmitted from the user terminal, and calculating importance of the corresponding service, and
   wherein the transmit wait queue is formed of data items including at least one of packet information to be serviced, the corresponding connection identifier, importance, and channel quality information when generating the transmit wait queue, the data items being in a linked list.

3. The method of claim 1, wherein b) comprises:
   extracting a data item from the transmit wait queue and determining a modulation and coding scheme (MCS) level according to channel quality information stored in the data item;
   calculating the number of subchannels in a radio frame for transmission of data to be serviced when the MCS level is determined;
   calculating the size of a service data transmittable through a currently available subchannel when the calculated number of subchannels in the radio frame is greater than the number of subchannels left in the current frame;
   allocating an amount of data corresponding to the calculated transmittable service data size to the available subchannel, and processing remaining data to be serviced in the next frame; and
   generating a PDU for wireless network transmission of the data allocated to the available subchannel.

4. The method of claim 3,
   wherein the number of subchannels in the radio frame is calculated in accordance with adaptive modulation and coding information determined by the size of the data allocated to the corresponding user within the frame and radio channel quality, and
   wherein the PDU is generated for a packet selected within the calculated number of subchannels at every frame.

5. The method of claim 3,
   wherein data failed to be transmitted in the current frame is transmitted in the next frame according to the transmission order in the transmit wait queue; and
   wherein in a), a total number of packets waiting to be serviced for each service is determined in accordance with a total number of packets left in the transmit wait queue when the packets queued in the transmit wait queue are failed to be transmitted in the current frame.

6. The method of claim 1, wherein, when a hybrid automatic repeat request (HARQ) is applied, b) comprises allocating a radio resource for a PDU burst waiting for retransmission, allocating a radio resource for the packet left in the transmit wait queue, and generating a PDU and frame data.

7. The method of claim 1, wherein in a),
   when the multimedia service type is a real-time service, a first scheduling algorithm for shortening a delay time is selected,
   when the multimedia service type is a non real-time service, a second scheduling algorithm for guaranteeing a minimum transmission speed is selected, and
   when the multimedia service type is a best effort service, a third scheduling algorithm for guaranteeing fairness or system efficiency in accordance with a desired performance standard is selected.

8. A scheduling apparatus scheduling packets transmitted to a user terminal from a base station that supports wireless access and network connection of the user terminal, the scheduling apparatus comprising
a scheduler comprising:
a packet classifier analyzing a packet header transmitted from the network and classifying the packet;
a storing unit storing the packet transmitted from the packet classifier;
a first scheduling process module selecting a scheduling algorithm appropriate for a multimedia service type provided from the base station based on quality of service for the multimedia service type, performing the selected scheduling algorithm, determining a packet transmission order, and forming a transmit wait queue,
the first scheduling process module further determining an amount of data allocation for each service available in a current frame in consideration of data service rates for the respective multimedia service types and a total number of packets queued for each service and selecting packets corresponding to the determined amount of data allocation for each service according to a scheduling algorithm applied for each service and storing packet information in the transmit wait queue; and
a second scheduling process module allocating a radio resource for a packet queued in the transmit wait queue, selecting data to be transmitted at every frame, and generating the corresponding generation information; and
a protocol data unit (PDU) generator generating a PDU according to the generation information provided by the scheduler,
wherein the multimedia service types include a real-time service, a non-real-time service and a best-effort service.

9. The scheduling apparatus of claim 8, wherein the first scheduling process module comprises:
a scheduling packet collector collecting scheduling information containing IP packet information and channel quality information according to a result of the packet determination;
an algorithm performer performing a scheduling algorithm predetermined for the corresponding service type and determining a packet transmission order based on the scheduling information; and
a wait queue generator generating a transmit wait queue based on the packets with the determined transmission order.

10. The scheduling apparatus of claim 8, wherein the second scheduling process module comprises:
a resource allocator allocating a radio resource for a packet according to the order of data items queued in the transmit wait queue, the data items including at least one of packet information to be serviced, the corresponding connection identifier, priority, and importance; and
an information generator selecting data to be transmitted at every frame, determining a transmittable data size, generating PDU generation information, and transmitting the PDU generation information to the PDU generator.

11. The scheduling apparatus of claim 8, wherein the first scheduling process module selects a first scheduling algorithm for shortening a delay time when the multimedia service type is a real-time service,
selects a second scheduling algorithm for guaranteeing a minimum transmission speed when the multimedia service type is a non real-time service, and
selects a third scheduling algorithm for guaranteeing fairness or system efficiency in accordance with a desired performance standard when the multimedia service type is a best effort service.

* * * * *